(12) United States Patent
Zhu et al.

(10) Patent No.: US 8,255,854 B2
(45) Date of Patent: Aug. 28, 2012

(54) ARCHITECTURE AND METHOD FOR COMPENSATING FOR DISPARATE SIGNAL RISE AND FALL TIMES BY USING POLARITY SELECTION TO IMPROVE TIMING AND POWER IN AN INTEGRATED CIRCUIT

(75) Inventors: Kai Zhu, Palo Alto, CA (US); Volker Hecht, Barsinghausen (DE)

(73) Assignee: Actel Corporation, Mountain View, CA (US)

( * ) Notice: Subject to any disclaimer, the term of this patent is extended or adjusted under 35 U.S.C. 154(b) by 264 days.

(21) Appl. No.: 12/753,247

(22) Filed: Apr. 2, 2010

(65) Prior Publication Data

US 2010/0192117 A1    Jul. 29, 2010

Related U.S. Application Data

(62) Division of application No. 11/859,678, filed on Sep. 21, 2007, now abandoned.

(60) Provisional application No. 60/826,712, filed on Sep. 22, 2006.

(51) Int. Cl.
*G06F 17/50* (2006.01)
*G06F 9/455* (2006.01)
*G06F 7/38* (2006.01)

(52) U.S. Cl. ........ 716/117; 716/110; 716/113; 716/116; 326/38

(58) Field of Classification Search .................. 716/108, 716/110, 113, 116–117; 326/38, 44–55, 326/384

See application file for complete search history.

(56) References Cited

U.S. PATENT DOCUMENTS

| | | | |
|---|---|---|---|
| 4,638,183 A | | 1/1987 | Rickard et al. |
| 4,924,430 A | * | 5/1990 | Zasio et al. .................. 716/108 |
| 5,495,182 A | | 2/1996 | Hardy |
| 5,502,403 A | | 3/1996 | Liu et al. |
| 5,583,451 A | | 12/1996 | Sharpe-Geisler |
| 5,621,338 A | | 4/1997 | Liu et al. |
| 5,635,856 A | | 6/1997 | Raza et al. |
| 5,796,624 A | | 8/1998 | Sridhar et al. |

(Continued)

OTHER PUBLICATIONS

Anderson, J. H. et al., "Active Leakage Power Optimization for FPGAs", Proceedings of the 2004 ACM/SIGDA 12th international symposium on Field programmable gate array, 2004, pp. 33-41, Monterey, California, USA.

(Continued)

*Primary Examiner* — Stacy Whitmore
(74) *Attorney, Agent, or Firm* — Lewis and Roca LLP

(57) ABSTRACT

A method for reducing delay in an integrated circuit by compensating for differences in rise and fall delay times comprises creating a timing graph; computing minimum delay tuples for nodes in the timing graph; if there is not at least one feasible delay tuple, determining a longest path and computing minimum delay tuples for the longest path; changing polarities on the longest path to reduce delays; updating the timing graph by transferring new polarity and delay values; performing timing analysis to determine a new longest path if the new longest path is shorter than the prior longest path, accepting a resulting polarity selection and computing minimum delay tuples for the longest path; if the new longest path is not shorter than the prior longest path, accepting a resulting polarity selection and implementing changes in a user-program bitstream.

2 Claims, 4 Drawing Sheets

U.S. PATENT DOCUMENTS

| | | | |
|---|---|---|---|
| 5,880,967 A * | 3/1999 | Jyu et al. | 716/113 |
| 6,121,797 A | 9/2000 | Song et al. | |
| RE37,577 E | 3/2002 | Liu et al. | |
| 6,466,049 B1 | 10/2002 | Diba et al. | |
| 6,477,695 B1 | 11/2002 | Gandhi | |
| 6,785,875 B2 | 8/2004 | Beerel et al. | |
| 6,993,737 B1 | 1/2006 | Anderson et al. | |
| 7,669,156 B2 * | 2/2010 | Hathaway et al. | 716/100 |
| 2003/0229873 A1 * | 12/2003 | Casavant | 716/6 |
| 2007/0007996 A1 | 1/2007 | Ranganathan et al. | |
| 2007/0136706 A1 | 6/2007 | Hwang et al. | |
| 2008/0072198 A1 * | 3/2008 | Celik et al. | 716/6 |
| 2010/0281448 A1 * | 11/2010 | He | 716/6 |

OTHER PUBLICATIONS

Zhu, Kai, "Post-Route LUT Output Polarity Selection for Timing Optimization", Proceedings of the ACM/SIGDA 15th International Symposium on Field Programmable Gate Arrays, FPGA 2007, Feb. 18-20, 2007, held in Monterey, California, USA, pp. 89-96, ACM Press, 2007.

* cited by examiner

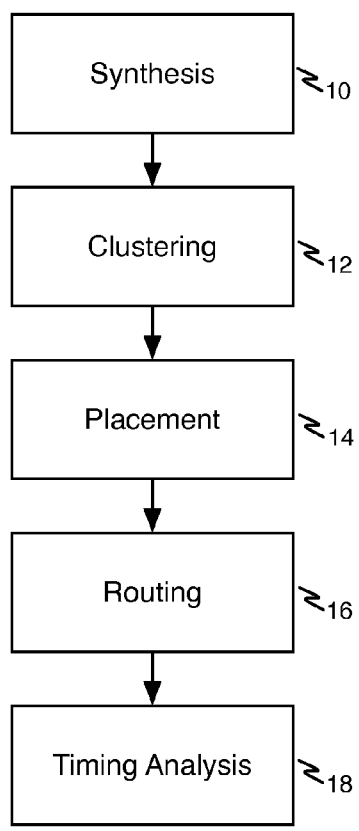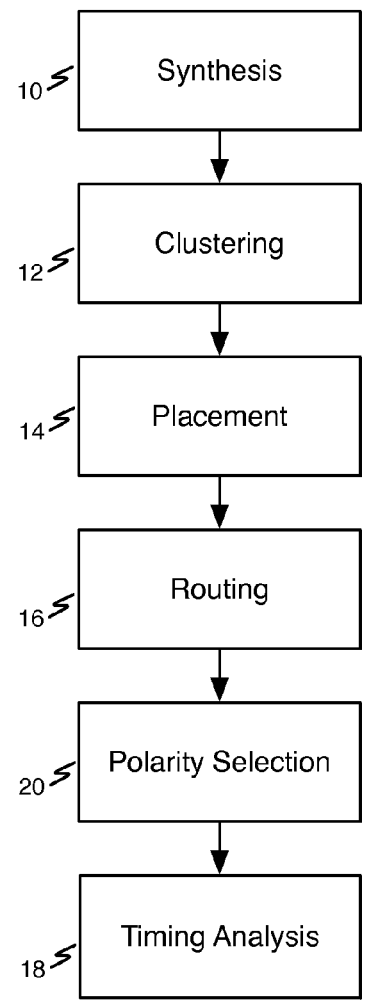
FIGURE 1A
(PRIOR ART)
FIGURE 1B

ARCHITECTURE AND METHOD FOR COMPENSATING FOR DISPARATE SIGNAL RISE AND FALL TIMES BY USING POLARITY SELECTION TO IMPROVE TIMING AND POWER IN AN INTEGRATED CIRCUIT

CROSS-REFERENCE TO RELATED APPLICATIONS

This application is a divisional of co-pending U.S. patent application Ser. No. 11/859,678, filed Sep. 21, 2007, which claims the benefit of U.S. Provisional Patent Application Ser. No. 60/826,712, filed Sep. 22, 2006, the entirety of both are incorporated by reference herein.

BACKGROUND OF THE INVENTION

1. Field of the Invention

The invention relates to integrated circuits including field programmable gate array (FPGA) and other programmable logic device (PLD) architectures and to optimization methods for such integrated circuits. More specifically, the invention relates to a method to compensate for disparate signal rise and fall times to improve timing and power performance in an integrated circuit.

2. The Prior Art

One kind of logic block widely used in FPGA architectures is a look-up table (LUT). The input and output pins on a LUT logic block can be programmed to either polarity. Specifically, the output of a LUT logic block can be inverted by inverting all the bits in the LUT truth table. An input pin of a LUT logic block can be inverted by swapping the bits in the LUT truth table controlled by the input pin.

The interconnect network of an FPGA architecture is usually implemented using routing multiplexers. As process geometry decreases, it becomes increasingly necessary to insert buffers at the outputs of the routing multiplexers, especially the routing multiplexers driving loads over long metal lines. A buffer is implemented as a cascaded inverter chain. The rise and fall times of a buffer are strongly related to the sizes of the p-type and n-type transistors in the inverters of the buffer. In the prior art, integrated circuit designers generally choose the ratio of the size of p-type and n-type transistors such that the difference in rise and fall times is minimized.

Synthesis is a step in the software flow in which a logic netlist is transformed to a form (such as a set of LUTs) that can be more readily implemented in FPGA. Placement and routing are two steps in implementing a user design in a programmable logic device. Placement is the step in the software flow in which the units of logic netlist (such as LUTs) are assigned to specific locations on an FPGA device.

Routing is the step in the software flow in which the connections between logic units in a netlist are realized using the interconnection wires in an FPGA device. Timing analysis is a step in the software flow in which a netlist implemented in an FPGA device is analyzed to estimate the speed at which the circuit described by the netlist can perform, and to develop other information that is useful for the FPGA users.

Meeting the timing constraints in design is an essential objective of FPGA software tools. The state-of-the-art flow for achieving this objective is shown in FIG. 1A and includes timing-driven synthesis (shown at reference numeral 10); timing-driven clustering (typically for cluster-based FPGA architecture) (shown at reference numeral 12); timing-driven placement (shown at reference numeral 14); and timing-driven routing (shown at reference numeral 16). Timing analysis (shown at reference numeral 18) is performed to verify the design.

Persons skilled in the art will note that none of the steps in the flow attempt to further improve timing by selecting optimal output polarity supported by the FPGA architecture.

BRIEF DESCRIPTION OF THE INVENTION

A method for reducing delay in an integrated circuit by compensating for differences in rise and fall delay times comprises creating a timing graph; computing minimum delay tuples for nodes in the timing graph; if there is not at least one feasible delay tuple, determining a longest path and computing minimum delay tuples for the longest path; changing polarities on the longest path to reduce delays; updating the timing graph by transferring new polarity and delay values; performing timing analysis to determine a new longest path if the new longest path is shorter than the prior longest path, accepting a resulting polarity selection and computing minimum delay tuples for the longest path; if the new longest path is not shorter than the prior longest path, accepting a resulting polarity selection and implementing changes in a user-program bitstream.

BRIEF DESCRIPTION OF THE DRAWING FIGURES

FIG. 1A is a flow diagram illustrating a conventional prior-art design flow.

FIG. 1B is a flow diagram illustrating a design flow according to an illustrative embodiment of the present invention.

DETAILED DESCRIPTION OF THE INVENTION

Figure 2A:
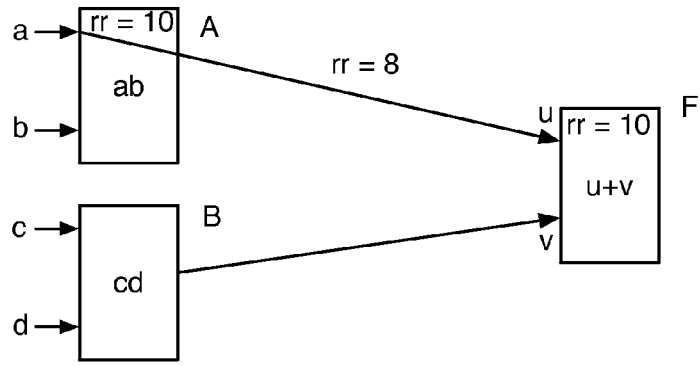
FIGS. 2A and 2B are block diagrams illustrating the effects of polarity inversion in a LUT configuration.

Persons of ordinary skill in the art will realize that the following description of the present invention is illustrative only and not in any way limiting. Other embodiments of the invention will readily suggest themselves to such skilled persons.

Due to the mobility difference in p-type and n-type transistors (i.e., holes in p-type transistors have a lower mobility than electrons in n-type transistors), the rise and the fall delays in the basic logic elements, including logic blocks (such as LUTs), buffers, and routing multiplexers, usually differ substantially. It is not unusual for the rise and fall delay differences to be the range of between about 10-30%. The differences between the rise and fall delays plus the flexibility in selecting output polarity on a LUT logic block provides an opportunity to further optimize timing and leakage power.

It is possible that allowing a larger difference between the rise and fall delays is better for timing optimization compared to the preference for a smaller difference as practiced in the prior art. This possibility is put to use in the present invention.

FIG. 1B is a flow diagram illustrating the process follow for place-and-route according to the present invention. An illustrative process flow according to the present invention employs timing-driven synthesis (shown at reference numeral 10); timing-driven clustering (typically for cluster-based FPGA architecture) (shown at reference numeral 12); timing-driven placement (shown at reference numeral 14); and timing-driven routing (shown at reference numeral 16). Timing analysis (shown at reference numeral 18) is performed to verify the design. However, unlike the prior art, the place-and-route process according to the present invention employs a polarity-selection process 20, performed after routing and prior to timing analysis.

One embodiment of the invention includes an integrated circuit design in which the ratio of the size of the P and N transistors is chosen not to minimize the difference in rise and fall times, but to minimize the total overall rise and fall times. While this type of design may lead to greater skew, the method of the present invention can be used to reduce the longest path delay in a particular design and therefore improve design performance.

For example, as shown in Table 1, in some circuits a ratio of width of the P transistor to width of the N transistor of 2:1 will lead to the minimum difference between rise and fall times, however, a ratio of 1.5:1 leads to a lower average rise/fall time. In addition to this design using a different ratio, a design method is included in this invention, in which a designer chooses a ratio of size of P and N transistors, performs the polarity selection method outlined below, and based on the results determines if the chosen ratio will decrease total delay while not increasing skew too much due to the application of the polarity selection method.

Table 1 shows the rise and fall delays of one buffer driving another identical buffer in a 90 nm process. The total width of the P and N transistor in each stage of the inverters is the same but the P-to-N transistor width varies. Columns rr and ff show the rise-rise and fall-fall delays, respectively. Column (rr+ff)/2 of Table 1 shows the average of rise-rise and fall-fall delays. Delays are in units of picoseconds. Column diff of Table 1 shows the relative difference between the rise-rise and fall-fall delays, defined as |rr−ff|/min{rr,ff}.

TABLE 1

| $W_p:W_n$ | $W_{p1}$ (µm) | $W_{n1}$ (µm) | $W_{p2}$ (µm) | $W_{n2}$ (µm) | rr | ff | (rr + ff)/2 | diff |
|---|---|---|---|---|---|---|---|---|
| 2:1 | 1.67 | 0.83 | 5.00 | 2.50 | 74.5 | 78.9 | 76.7 | 6.1% |
| 1.5:1 | 1.50 | 1.00 | 4.50 | 3.00 | 68.6 | 78.9 | 73.8 | 15.0% |
| 1:1 | 1.25 | 1.25 | 3.75 | 3.75 | 74.7 | 81.4 | 78.0 | 9.0% |

From Table 1, it may be seen that the rise and fall delays are usually different. Furthermore, it can be seen that minimizing the average delay is not always compatible with minimizing the rise-fall delay difference (e.g., the $W_p:W_n$ ratio of 1.5:1 has a larger rise-fall delay difference than the ratio of 2:1 but a smaller average delay).

The present invention utilizes the flexibility in a modern FPGA that supports polarity propagation to select LUT output polarity to further improve timing and power. LUTs have generally been invertible, but a modern trend has been to provide inverting capability to other circuits such as, for example, I/O circuits, RAM block inputs and outputs, and other circuit block inputs and outputs.

The present invention includes methods to further improve timing and power, by optimally selecting the output polarity of lookup tables (LUTs) in an FPGA device. Compared with the state-of-the-art flow, the invention provides methods to take advantage of polarity influence on timing and power.

As is known in the art, the rise and fall times for LUTs are not symmetrical. This invention involves manipulating the netlist to implement the timing and power improvements. The present invention may be applied to any PLD (or even ASIC) that has a signal-inversion capability, but is especially suited for use with an architecture that includes LUTs. The present invention also includes a method by which the paths that are to be optimized are selected. The present invention involves synthesizing the design, then looking at the delay table, determining the important paths, and implementing inversions accordingly.

Figure 2B:
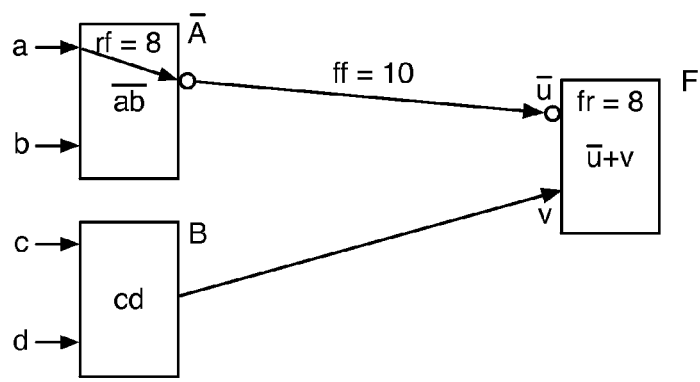

FIGS. 2A and 2B show an example of the effects of LUT polarity inversion. The rr, rf, fr, and ff delays are shown. As shown in FIG. 2A, if LUT A is not inverted, the path a-A-u-F has a delay equal to 28. With the output of LUT A inverted as shown in FIG. 2B, the path a-A-u-F has a delay equal to 26. To maintain the circuit function unchanged, the input pin u on LUT F driven by the inverted output of LUT A is also inverted.

FIGS. 2A and 2B illustrate that the method described in the invention can be used in a software flow to adjust LUT output polarity and the associated Boolean equations, to further optimize timing and power. Specifically, after the routing has been performed, the method of the present invention can be used as shown in FIG. 1B.

Figure 3:
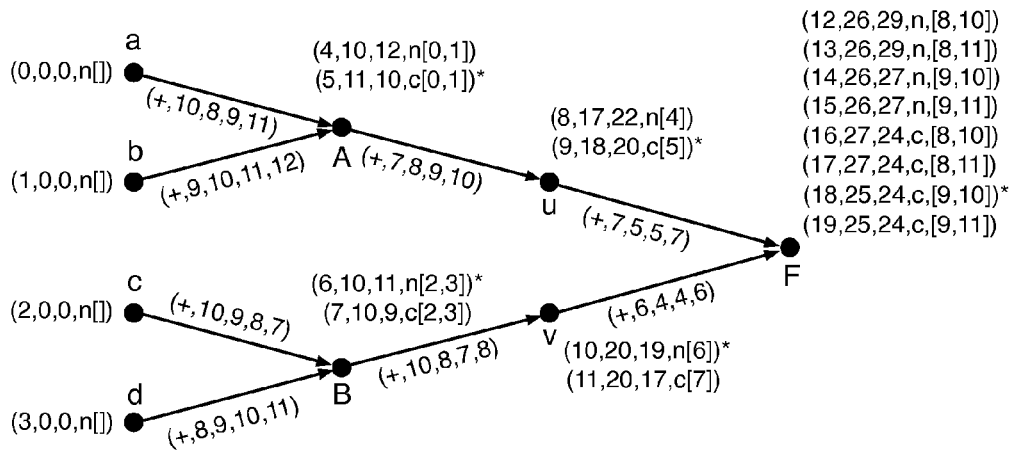
FIG. 3 illustrates the computation of delay tuples of nodes in a timing graph representing the logic diagram of FIGS. 2A and 2B.

FIG. 3 shows computation of delay tuples of nodes in the timing graph representing the logic schematic in FIGS. 2A and 2B. The tuple notation for an edge e is ($\tau(e)$, $d^{rr}(e)$, $d^{rf}(e)$, $d^{fr}(e)$, $d^{ff}(e)$). The delay tuple notation for a node u is (id, $d^r(u)$, $d^f(u)$, pol(u), pre). For the LUT output nodes A, B, F, both polarities are considered in delay tuple computation. For node F, the minimum delay tuple set contains only two tuples: (14, 26, 27, n, [9, 10]) and (18, 25, 24, c, [9, 10]). The minimum delay tuple of node F is (18, 25, 24, c[9, 10]). The selected minimum delay tuple of node F and the selected delay tuples of other nodes during back trace are marked with '*'.

The present invention allows the user to optimize a design for either power or timing while minimizing the adverse effect on the other parameter. The method can be applied to architectures that either support polarity propagation everywhere or only in selected portions of the FPGA fabric. The method does not require modification in either placement or routing, and is easy to implement.

In one embodiment of the invention, the method selects LUT output polarity in a general direct acyclic graph (DAG). A node in a DAG can drive more than one load pin. In general, a timing graph is a DAG. In a DAG a node can have more than one parent.

According to the present invention, the output polarity for LUTs is iteratively selected in the longest path. The polarity selection will generally reduce the delay for the current longest path, but may potentially increase the delays on other paths. The method accepts the selected polarity only if the new longest delay is less than the current longest path delay.

According to another embodiment of the invention, the output polarity of all LUTs in a tree interconnection network is selected so that the maximum delay from primary inputs to primary output is minimized. A tree interconnection network is a special case of a DAG in which each node can have only one parent.

Whether a design is constructed as a tree interconnection network is determined by the particular user program (for a programmable logic device) or by the specific circuit design for an application specific integrated circuit (ASIC). Briefly, the method sorts all nodes in a timing graph in a topological order. The maximum delays in nodes are computed in the topological order. The rise and fall delays are computed separately and considered as a related pair in delay comparison. Both polarities for every LUT output pin are considered in the maximum delay computation. Efficient pruning method is used to reduce memory usage and to improve computation efficiency.

The optimal polarity selection for every LUT output is decided by tracing back from the primary output to the primary inputs. The polarity selection is optimal in the sense that the maximum delay from primary inputs to primary output is minimized among all possible polarity selections for all LUT outputs in the tree.

Another embodiment of the invention includes a method to optimize slack in a design. Very often, a design would have a target speed defined by the users. The target speed is specified as a required time on the primary outputs in a timing graph. Different primary outputs may have different required times. The objective for a design with target speed is usually to meet the required time rather than minimizing the maximum delays. To achieve this objective, the slacks, i.e. the difference of the maximum delay from the required time, should be maximized. The invention describes a method to maximize slacks by optimally selecting LUT output polarity.

Another embodiment of the invention is a method to minimize leakage power while meeting the timing target. The leakage power from routing multiplexers and the associated buffers accounts for a significant portion of the total leakage power. The power leakage on a routing multiplexer is usually lower when the routing multiplexer output is in logic 1 than that in logic 0. Through dynamic simulation, the probability of a routing multiplexer in logic 1 state can be determined. The probability can then be used to estimate total power leakage from all routing multiplexers.

The present invention also considers the impact of LUT output polarity on leakage power. The LUT output polarity selection by the method is the selection that meets the timing target while minimizing the total leakage power from routing multiplexers.

Table II shows a rise and fall delay computation. Prior-art calculations of this type do not include polarity information.

TABLE 2

| pol(u) | $\tau(u, v)$ | pol(v) | $d^r(v)$ | $D^f(v)$ |
|---|---|---|---|---|
| n | + | n | $d^r(u) + d^{rr}(u, v)$ | $d^f(u) + d^{ff}(u, v)$ |
| n | + | c | $d^f(u) + d^{fr}(u, v)$ | $d^r(u) + d^{rf}(u, v)$ |
| n | − | n | $d^f(u) + d^{fr}(u, v)$ | $d^r(u) + d^{rf}(u, v)$ |
| n | − | c | $d^r(u) + d^{rr}(u, v)$ | $d^f(u) + d^{ff}(u, v)$ |
| c | + | n | $d^f(u) + d^{fr}(u, v)$ | $d^r(u) + d^{rf}(u, v)$ |
| c | + | c | $d^r(u) + d^{rr}(u, v)$ | $d^f(u) + d^{ff}(u, v)$ |
| c | − | n | $d^r(u) + d^{rr}(u, v)$ | $d^f(u) + d^{ff}(u, v)$ |
| c | − | c | $d^f(u) + d^{fr}(u, v)$ | $d^r(u) + d^{rf}(u, v)$ |
| n/c | x | n/c | $d^r(u) + d^{rr}(u, v)$ | $d^r(u) + d^{rr}(u, v)$ |

To obtain the rise and fall delay values for implementing the methods according to the invention, the data could be provided through simulation software based on known characteristics of the transistors and circuits being used. Alternatively, actual measured data from a manufactured device could be used.

As used herein, "topological order" is an order for parsing the nodes in a DAG by traversing from a source node to a sink node. In this method, generally "children" nodes are parsed first, then their "parent" nodes. "Initialize" means selecting a starting source node. For a timing graph, the method of selecting a starting source node is known in the art.

Figure 4:
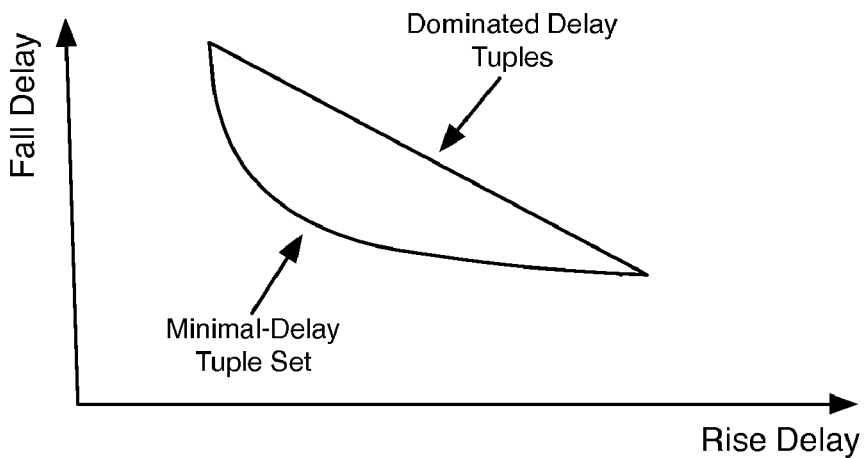
FIG. 4 is a graph showing delay tuple dominance.

Whether or not a tuple is "feasible" is explained herein. "Back trace" means to select the best one and trace back to the source node. "Pruning" means to automatically discard the choices easily identifiable as "bad" while keeping the rest in order to select at the end of the process. The graph in FIG. 4 shows an example of results that can be pruned, vs. those that will be kept for a decision at the end. A bitstream is the user configuration for a programmable logic device that is used to program the device. As is known in the art, there is an analogous entity in the ASIC design field.

Static timing analysis captures a netlist using a timing graph. In a timing graph G=(V,E), each node u∈U represents a pin in the netlist. A net connection is a pair of pins (u, v), where the driver pin u drives the load pin v. A cell arc is a pair of pins (u, v), where both pins are on the same cell (e.g., logic block or IO block), with u representing an input pin and v representing an output pin. Each edge e=(u, v)∈E represents either a net connection or a cell arc. A primary input (PI) of a circuit is a pin that drives other pins but is not driven by any other pin. A primary output (PO) of a circuit is a pin that is driven by other pins but does not drive any other pin. A PI is usually an input 10 or a data output pin on a sequential element. A PO is usually an output 10 or a data input pin on a sequential element. A source node s and a sink node t are added to G. For every PI node u, there is an edge (s, u). For every PO node v, there is an edge (v, t). In general a timing graph G is a DAG.

The arrival time d(u) of a node u is the maximum delay from any PI to u. For the source node s, the arrival time is d(s)=0. For a node u∈V other than t, the arrival time is computed in topological order from PIs, as follows:

$$d(u) = \max_{\forall (u,v) \in E} \{d(v) + d(v, u)\}, \quad (1)$$

where d(v, u) is the delay over edge (v, u). The required time r(u) of a node u is the latest time that a signal must arrive at node u from source node s. For the sink node t, the required time is derived from the timing constraints, such as the target clock frequency. For a node u∈V other than t, the required time is computed in reverse topological order from POs, as follows:

$$r(u) = \min_{\forall (v,u) \in E} \{r(v) - d(u, v)\} \quad (2)$$

The slack s(u) of a node u is the difference of the arrival time from the required time:

$$s(u) = r(u) - d(u) \quad (3)$$

A rising signal is a transition from logic 0 to logic 1. A falling signal is a transition from logic 1 to logic 0. If after passing through an edge (u, v), a rising signal at node u remains a rising signal at node v, and a falling signal at node u remains a falling signal at node v, the edge (u, v) is said to have positive transmission type. For example, a cell arc of an AND gate has positive transmission type. If a rising signal at node u becomes a falling signal at node v, and a falling signal at node u becomes a rising signal at node v, the edge (u, v) is said to have negative transmission type. For example, a cell arc of a NAND gate has negative transmission type. If a rising signal at node u could either remain a rising signal or become a falling signal at node v, and a falling signal at node u could either remain a falling signal or become a rising signal at node v, the edge (u, v) is said to have unknown transmission type. For example, a cell arc of a XOR gate has unknown transmission type. Positive, negative, and unknown transmission type of an edge is denoted by notation '+', '−', and 'x', respectively.

Through an edge (u, v), there are possible four different delays:

rise-rise delay $d^{rr}(u, v)$ is the delay of a rising signal at node u to a rising signal at node v.

fall-fall delay $d^{ff}(u, v)$ is the delay of a falling signal at node u to a falling signal at node v.

rise-fall delay $d^{rf}(u, v)$ is the delay of a rising signal at node u to a falling signal at node v.

fall-rise delay $d^{fr}(u, v)$ is the delay of a falling signal at node u to a rising signal at node v.

Together, the transmission type and the four delays of an edge describe the delay characteristics of the edge. These characteristics of an edge (u, v) are denoted by a tuple $(\tau(u, v), d^{rr}(u, v), d^{rf}(u, v), d^{fr}(u, v), d^{ff}(u, v))$, where (u, v) is the edge transmission type. Note that for an edge representing a LUT cell arc with positive or negative transmission type, it is necessary to know all four delays in order to consider different polarity, as to be explained in the next section.

For a node u, the arrival times for a rising signal and a falling signal at u could be different. The rise arrival time (or rise delay) of node u is defined to be the maximum delay of any signal from any PI to node u as a rising signal, and denoted by $d^r(u)$. Similarly, the fall arrival time (or fall delay) of node u is defined to be the maximum delay of any signal from any PI to node u as a falling signal, and denoted by $d^f(u)$. The arrival time of node u is the maximum of rise arrival time and fall arrival time, i.e., $d(u)=\max\{d^r(u), d^f(u)\}$.

The rise and fall delays of a node can be computed as follows. Consider an edge (u, v) with positive transmission type. A rising signal at node u will remain a rising signal at node v, after a delay of $d^{rr}(u, v)$. Therefore, $$d^r(v)=d^r(u)+d^{rr}(u,v) \quad (4)$$

Similarly for the fall delay, $$d^f(v)=d^f(u)+d^{ff}(u,v) \quad (5)$$

For an edge (u, v) with negative transmission type, a rising signal at node u will become a falling signal at node v, after delay amount of $d^{rf}(u, v)$. Therefore, $$d^f(v)=d^r(u)+d^{rf}(u,v) \quad (6)$$

Similarly for the rise delay, $$d^r(v)=d^f(u)+d^{fr}(u,v) \quad (7)$$

For an edge (u, v) with unknown transmission type, the rise delay at node v is the maximum of equations (4) and (7), $$d^r(v)=\max\{d^r(u)+d^{rr}(u,v),d^f(u)+d^{fr}(u,v)\} \quad (8)$$

The fall delay at node v is the maximum of equations (5) and (6), $$d^f(v)=\max\{d^f(u)+d^{ff}(u,v),d^r(u)+d^{rf}(u,v)\} \quad (9)$$

In general, for a node v with multiple fanins, the rise delay of node v is the maximum of all the rise delays computed from all fanins, $$d^r = \max_{\forall (u,v)\in E}\{d^r_{(u,v)}(v)\} \quad (10)$$

where $d^r_{(u,v)}(v)$ is the rise delay at v through edge (u, v) as computed using equations (4), (7), (8). Similarly, the fall delay of node u is the maximum of all the fall delays computed from all fanins, $$d^f(v) = \max_{\forall (u,v)\in E}\{d^f_{(u,v)}(v)\} \quad (11)$$

where $d^f_{(u,v)}(v)$ is the fall delay at v through edge (u, v) as computed using equations (5), (6), (9). Note that equations (10) and (11) are extension of equation (1) with consideration of the differences of rise and fall delays.

Algorithms are described for selecting output polarity of LUTs so that the longest path delay is minimized. Since rise and fall delays generally are different, instead of keeping just one delay value d(u) for a node u, both rise delay $d^r(u)$ and fall delay $d^f(u)$ values are kept. The rise and fall delays of a node u are denoted by a tuple $(d^r(u), d^f(u))$, which is called a delay tuple of node u.

As in computing the arrival time in static timing analysis, node delay tuples are computed in a topological order starting from PIs. Each PI node has one delay tuple (0,0), i.e., both rise delay and fall delay for a PI node are zero. When computing a node u other than PIs, the delay tuples for all the predecessor nodes of u have already been computed.

To consider the impact of different polarities of LUT output on the arrival times, the node delay tuple computation is extended. If a node u represents a LUT output pin, in addition to computing the delay tuples of u without changing the LUT output polarity, the delay tuples of u are also computed with LUT output polarity changed. When changing the polarity of LUT output, the rules for computing rise and fall delays need to be extended.

As illustrated in FIGS. 2A and 2B, when the polarity of a LUT output is changed, the polarities on the input pins driven by the LUT output also need to be changed in order to maintain logic functionality. This means that when computing the rise and fall delays of a node representing an output pin, in addition to considering the edge transmission type, it is considered whether the input polarity has been changed. For example, for an edge (u, v) with positive transmission type, if the polarity of input node u is not changed, then the rise delay of node v is computed using equation (4). However, if the input node u polarity is changed, then the transmission type of edge (u, v) is effectively changed to negative, and the rise delay of node v needs to be computed using equation (7). In general, the polarity of the input node of an edge must be considered in addition to the edge transmission type when computing node rise and fall delays.

The polarity of node u is denoted by pol(u). Table 2 summarizes the rules of rise and fall delays computation through an edge (u, v), with consideration of input node u polarity pol(u), edge transmission type τ(u, v), and the output node v (if the output node represents a LUT output) polarity pol(v). In the columns pol(u) and pol(v), value "n" means the polarity is not changed, and value "c" means the polarity is changed.

To properly compute delay tuples, the information about LUT output polarity change needs to be included as part of the delay tuples. In addition, it is recorded from which tuples in the predecessor nodes the current tuple is computed, so that the polarity selection solution can be reconstructed after delay computation. For these purposes, the delay tuple notation for a node u is extended to (id, $d^r(u)$, $d^f(u)$, pol(u), pre), where id is the index for this tuple, pre is the list of tuple ids from which this tuple is computed, and pol(u) is a Boolean value indicating either (1) for a node representing a LUT output, whether the polarity of the node is changed; or (2) for a node representing an input pin a, whether the polarity of the driver pin of the input pin a has been changed.

Referring again to FIG. 3, the timing graph representation of the schematic in FIGS. 2A and 2B, shows the delay tuples computed for each node. Polarity changes are considered for the outputs of all three LUTs in the delay tuple computation. The outputs of LUTs A and B each have two delay tuples, and the output of LUT F has eight delay tuples. Note that for a connection edge (u, v) (e.g., edges (A, u) and (B, v)), the polarity field pol(u) in each delay tuple of the driver node u is simply copied to the corresponding delay tuple of the load node v.

For a node u with k direct predecessors, the number of delay tuples is $\Pi_{1 \leq i \leq k} n_i$, where $n_i$ is the number of delay tuples in the ith direct predecessor of u. If u represents a LUT output pin, considering polarity change, the number of delay tuples of u is $2\Pi_{1 \leq i \leq k} n_i$.

If all delay tuples are stored during delay computation, the number of delay tuples would grow exponentially. For the purpose of finding the polarity selection for LUT outputs to minimize the longest path delay, it is not necessary to store the delay tuples that would result in longer delay than that from other delay tuples during delay computation. For two delay tuples t1 and t2, t1 dominates t2 if both delay tuples have the same polarity and the rise and fall delays of t1 are less than or equal to the rise and fall delays of t2, respectively. More formally, given two delay tuples $(d^r_1(u), d^f_1(u), pol_1(u))$ and $(d^r_2(u), d^f_2(u), pol_2(u))$ of node u, if $pol_1(u)=pol_2(u)$, $(d^r_1(u) \leq d^r_2(u)$, and $d^f_1(u) \leq d^f_2(u)$, it is said that tuple $(d^r_1(u), d^f_1(u), pol_1(u))$ dominates tuple $(d^r_2(u), d^f_2(u), pol_2(u))$.

The following lemma states that a dominated delay tuple always produces a dominated delay tuple in its successor nodes.

Lemma 1: If a delay tuple t of the direct predecessor nodes of node u is a dominated delay tuple, then any delay tuple of u that uses delay tuple t in delay computation is also a dominated delay tuple of u.

Proof. Without loss of generality, consider an edge (u, v). Let $(d^r_1(u), d^f_1(u))$ and $(d^r_2(u), d^f_2(u))$ be two delay tuples of u with the same output polarity. Assume $(d^r_1(u), d^f_1(u))$ dominates $(d^r_2(u), d^f_2(u))$. It has been proved that any delay tuple of node v computed from delay tuple $(d^r_2(u), d^f_2(u))$ is dominated by another delay tuple of node v computed from delay tuple $(d^r_1(u), d^f_1(u))$.

Case 1. Edge (u, v) is the only in-edge of node v. Consider the case where polarity of u is not complemented, edge (u, v) has positive transmission type, and v polarity is not complemented. Any tuple of node v computed from $(d^r_2(u), d^f_2(u))$ is computed as $$d^r_2(v) = d^r_2(u) + d^{rr}(u,v)$$

$$d^f_2(v) = d^f_2(u) + d^{ff}(u,v)$$

There is another delay tuple of node v computed from (dr1(u), df1(u)) that is computed as $$d^r_1(v) = d^r_1(u) + d^{rr}(u,v)$$

$$d^f_1(v) = d^f_1(u) + d^{ff}(u,v)$$

Since $(d^r_1(u), d^f_1(u))$ dominates $(d^r_2(u), d^f_2(u))$, therefore $$d^r_1(u) \leq d^r_2(u)$$
$$\Rightarrow d^r_1(u) + d^{rr}(u,v) \leq d^r_2(u) + d^{rr}(u,v)$$
$$\Rightarrow d^r_1(v) \leq d^r_2(v)$$

Similarly, it can be shown that $d^f_1(v) \leq d^f_2(v)$. Therefore, (dr2(u), df2(u)) is dominated by $(d^r_1(u), d^f_1(u))$.

The proof above can be applied to other combinations of edge transmission and node polarity.

Case 2. Node v has multiple fanins and node u is one of the direct predecessors of node v. A delay tuple of v computed from $(d^r_2(u), d^f_2(u))$ is computed as $$d^r_2(v) = \max\{d^r_{(u',v)}(v), d^r_{2(u,v)}(v)\}$$
$$\forall (u',v) \in E, u' \neq u$$

$$d^f_2(v) = \max\{d^f_{(u',v)}(v), d^f_{2(u,v)}(v)\}$$
$$\forall (u',v) \in E, u' \neq u$$

where $d^r_{2(u,v)}(v)$ is the rise delay of node v computed from tuple $(d^r_2(u), d^f_2(u))$ through edge (u, v). Another tuple of v computed from $(d^r_1(u), d^f_1(u))$ is computed as $$d^r_1(v) = \max\{d^r_{(u',v)}(v), d^r_{1(u,v)}(v)\}$$
$$\forall (u',v) \in E, u' \neq u$$

$$d^f_1(v) = \max\{d^f_{(u',v)}(v), d^f_{1(u,v)}(v)\}$$
$$\forall (u',v) \in E, u' \neq u$$

where $d^r_{2(u,v)}(v)$ is the rise delay of node v computed from tuple $(d^r_2(u), d^f_2(u))$ through edge (u, v).

(2.a) If $d^r_{1(u,v)}(v) \geq \max_{\forall (u',v) \in E, u' \neq u}\{d^r_{(u',v)}(v)\}$ then $$d^r_1(v) = d^r_{1(u,v)}(v) \leq d^r_{2(u,v)}(v) \leq \max\{d^r_{(u',v)}(v), d^r_{2(u,v)}(v)\}$$
$$\forall (u',v) \in E, u' \neq u$$

$$= d^r_2(v)$$

(2.b) If $d^r_{1(u,v)}(v) < \max_{\forall (u',v) \in E, u' \neq u}\{d^r_{(u',v)}(v)\}$ then $$d^r_1(v) = \max\{d_{r(u',v)}(v)\} \leq \max\{d^r_{(u',v)}(v), d^r_{2(u,v)}(v)\}$$
$$\forall (u0,v) \in E, u' \neq u \quad \forall (u,v) \in E, u' \neq u$$

$$= d^r_2(v)$$

Combining (2.a) and (2.b), yields $d^r_1(v) \leq d^r_2(v)$. Similarly, it can be shown that $d^f_1(v) \leq d^f_2(v)$.

Combining cases 1 and 2, demonstrates that $(d^r_2(u), d^f_2(u))$ dominated by $(d^r_1(u), d^f_1(u))$.

By lemma 1, a dominated delay tuple in a predecessor node u of sink node t, i.e. $u \in G \backslash \{t\}$, always produces dominated delay tuples in the sink node t. Therefore, all dominated delay tuples during delay computation can be pruned, without missing any cases that would potentially produce shorter longest path delays.

If in a set S(u) of delay tuples of node u, none of the delay tuples in S(u) is dominated by any other delay tuple in S(u), then the set S(u) is called a minimal delay tuple set (MDTS)

of node u. FIG. 4 illustrates the meaning of minimal delay tuple set. The lower envelope curve corresponds to the minimal delay tuple set, and the (shaded) area above the curve represents the dominated tuples.

In the example of FIG. 3, node F has eight delay tuples before pruning. After pruning, the minimal delay tuple set of node F contains only two delay tuples: (14, 26, 27, n, [9, 10]) and (18, 25, 24, c, [9, 10]). The remaining delay tuples are the dominated tuples. Experiments have shown that the vast majority of delay tuples are dominated tuples, indicating the pruning is very effective.

The algorithm for LUT output polarity selection consists of two phases. The first phase computes the minimal delay tuple sets of all nodes. The second phase back traces from the sink node to decide the polarity for all LUT outputs.

Figure 5:
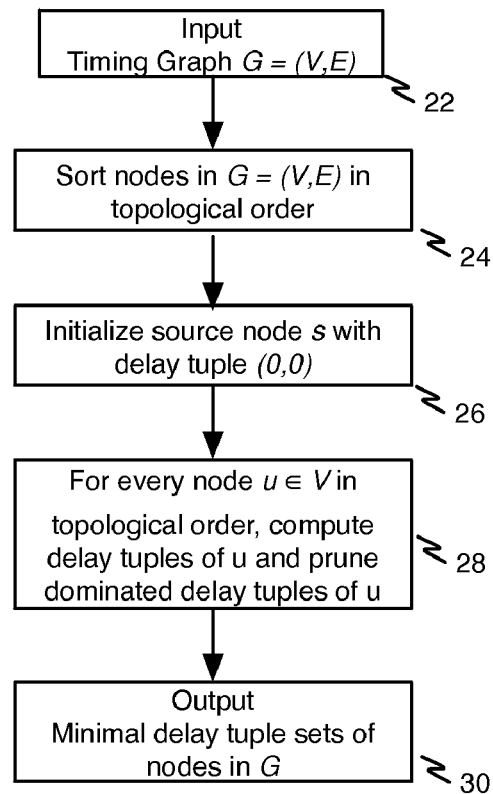
FIG. 5 is a flow diagram illustrating an illustrative process for determining the minimal delay tuple sets of a timing graph.

The nodes in a timing graph are sorted in topological order. All the PI nodes are initialized with zero rise and fall delays. The minimal delay tuple sets of all nodes in the timing graph are computed in topological order from the PI nodes. The algorithm, named MDTS, for computing the minimal delay tuple sets of a timing graph is summarized in FIG. 5. Input of the timing graph G=(V,E) is provided at reference numeral 22. At reference numeral 24 the nodes in G=(V,E) are sorted in topological order. At reference numeral 26, the source node s is initialized with a delay tuple (0,0). At reference numeral 28, delay tuples of u and prune dominated tuples of u are computed in topological order for every node u∈V. At reference numeral 30, minimum delay tuple sets of nodes in G are output.

The timing graph of a netlist is a DAG. For a graph G=(V, E), the fanin cone of a node u, denoted as C(u), is the maximum subgraph of V consisting of u and its predecessors such that any path connecting a node in C(u) and u lies entirely in C(u). From a delay tuple (id, d(u), d$^f$(u), pol(u), pre) of node u, the polarity selection of all LUT outputs in the fanin cone of u are found by back tracing from the delay tuple following the predecessor tuples recorded in the tuple list pre. In a minimal delay tuple set S(u) of node u, the minimum delay tuple of S(u) is the delay tuple with the minimum delay. Recall that the delay of a delay tuple is the maximum of the rise and fall delays. To achieve maximum reduction of the longest path delay, we select the minimum delay tuple of sink node t for back tracing. In the example of FIG. 3, the minimal delay tuple set of LUT F output node is {(14, 26, 27, n, [9, 10]), (18, 25, 24, c, [9, 10])}, and the minimum delay tuple is (18, 25, 24, c, [9, 10]). The minimum delay tuple of LUT F output node and the selected tuples in other nodes decided by the back tracing are marked with '*'.

An output node in a DAG may drive multiple fanouts. Back tracing from a delay tuple t(u) of node u, for a LUT output node v in the fanin cone of u, where v drives multiple fanouts, the fanout nodes of v may or may not have the same polarity selection decided by the delay tuple t(u). A delay tuple t(u) of node u is a feasible delay tuple if every LUT output node in the fanin cone of u has the same polarity selection from all its fanout nodes as that decided by the delay tuple t(u). Otherwise, the delay tuple t(u) is an infeasible delay tuple if there exists at least one LUT output node in the fanin cone of u whose fanout nodes have conflicting polarity selections as decided by the delay tuple t(u). The minimum feasible delay tuple of a delay tuple set S(u) of node u is the minimum delay tuple of S(u) that is feasible.

Figure 6:
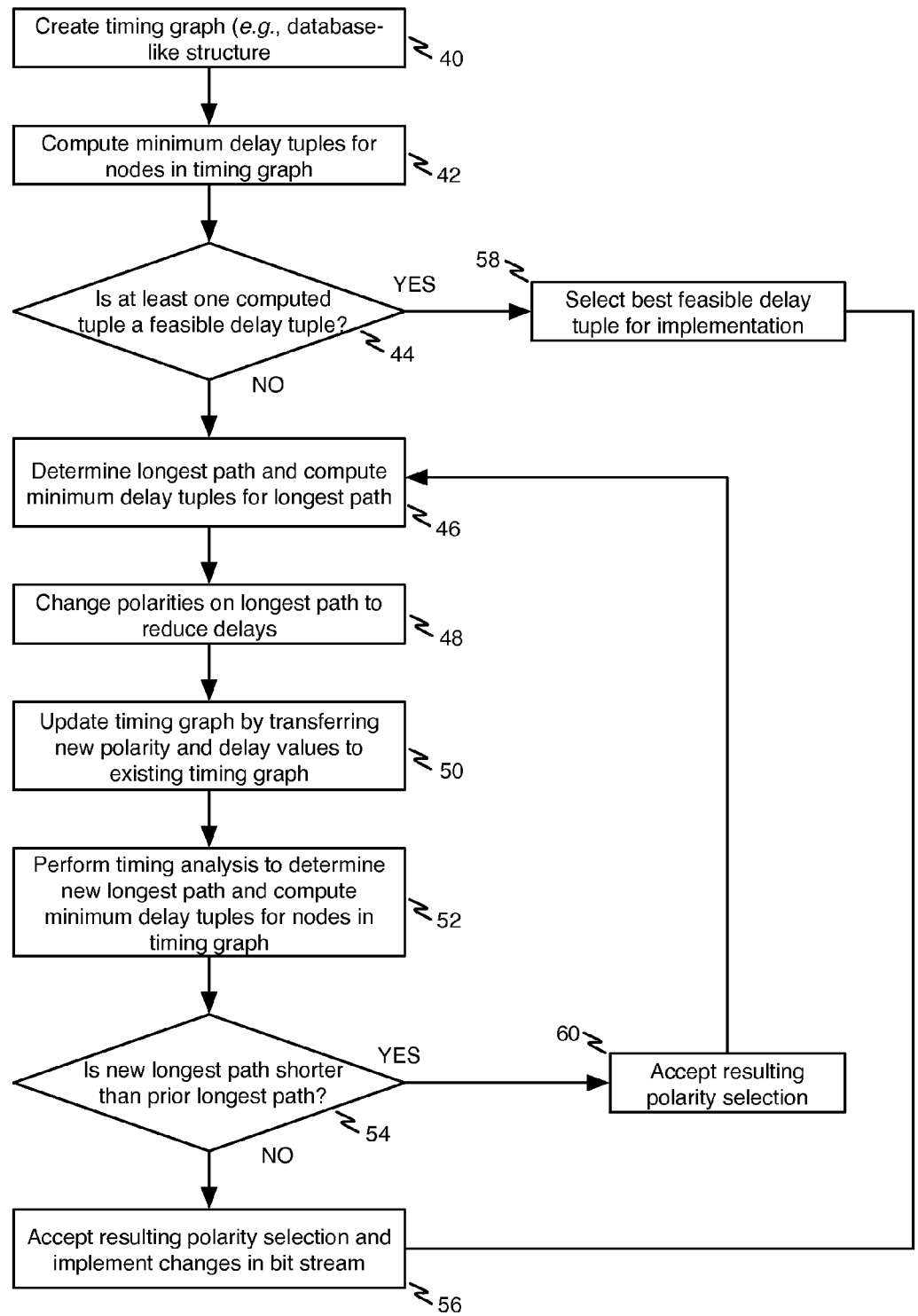
FIG. 6 is a flow diagram depicting an illustrative process for polarity selection according to the present invention.

Referring now to FIG. 6, it may be seen that the algorithm for LUT output polarity selection for a DAG uses an iterative approach to find the minimum feasible delay tuple.

Given a timing graph G, first the minimal delay tuple sets is computed for all nodes in G. From the minimal delay tuple set of sink node t, in the order of increasing delay of delay tuples, it is checked whether there exists any feasible delay tuple of sink node t. If any delay tuple of sink node t is feasible, the polarity selection is accepted and the process stops. If none of the delay tuples of the sink node t are feasible, LUT output polarity is selected iteratively, as follows. First, the minimal delay tuple set for the nodes along the current longest path is computed using algorithm MDTS in FIG. 5, and LUT output polarity for the current longest path is selected. Then for each LUT output whose polarity is changed, in the order from the source node to the sink node, the delays from the LUT output forward are propagated to the sink node t. The LUT output polarity selection on the current longest path may potentially increase the delays on other paths that previously were not the longest path. If the delay of any other path exceeds the current longest path delay, the process stops. Otherwise, the LUT output polarity changes on the current longest path are accepted, and the iteration continues.

Theorem 1: For a tree network, the longest path delay computed by the algorithm is minimum among all possible LUT output polarity selections.

Proof. The theorem follows from the following three facts: (1) The delay tuple computation considers all possible combinations of LUT output polarity selection; (2) From Lemma 1, the pruned delay tuples do not exclude cases that could result in shorter longest path delay; and (3) In a tree network, every output has fanout 1. Therefore, all delay tuples are feasible delay tuples.

Besides the optimal polarity selection for a tree network produced by the algorithm, the algorithm would also produce optimal polarity selection for a general DAG if a feasible delay tuple exists in the sink node t.

Both the topological sort and back trace steps of the algorithm are linear in the size of the timing graph. Even with pruning, the size of minimal delay tuple set of a node theoretically could still grow exponentially. However, as has been experimentally demonstrated, the pruning is very effective. The minimal delay tuple set of a node is mostly of size no more than 10.

It should be pointed out that the algorithm does not require all input pins on all logic blocks to be invertible. If any load pin driven by a LUT output is not invertible, the LUT output polarity cannot be changed. The non-invertible input pins partition the FPGA fabric into separate regions in which the input pins are invertible. The algorithms can be used in such regions separately to optimize timing.

The algorithm described in previous section is extendable to minimize active leakage power under timing constraints. It is shown in J. H. Anderson, F. N. Najim, and T. Tuan, "Active Leakage Power Optimization for FPGAs", *Proc. ACM/SIGDA 12th Int'l Symposium on Field Programmable Gate Arrays*, February 2004, pp. 33-41, that a routing multiplexer has lower active leakage power when the routing multiplexer output in logic 1 state than in logic 0 state. An algorithm is described in this reference to minimize the active leakage power by choosing the LUT output polarity so that the probability of the outputs of the routing multiplexers driven by the LUT in logic 1 state is maximized. However, the algorithm does not consider the impact on timing by the polarity changes. Since the primary consideration of most FPGA designs is meeting the timing objectives, polarity selection should first consider timing before considering active leakage power minimization. The algorithms can be extended for this purpose.

As explained in this reference, each net has a fundamental property called static probability, which is the fraction of time the net in logic 1 state. After routing, the net is routed using a tree of routing multiplexers. The active leakage power of the net is the sum of the active leakage power of all the routing multiplexers in the routing tree of the net. More formally, for a net n, the active leakage power L(n) of net n is computed as $$L(n) = \sum_{\forall m \in En} \{p_n L_m^1 + (1-p_n) L_m^0\}, \quad (12)$$

where L1 m and L0 m are the leakage powers of routing multiplexer m in the routing tree of net n when m output is in logic 1 and logic 0 state, respectively, and pn is the static probability of net n. The static probability of every net can be computed using functional simulation, and the active leakage power of every routing multiplexer in different output states can be computed by circuit simulation.

The goal of polarity selection is to minimize the total active leakage power while meeting the timing constraint. For a node u, let L(u) be the total leakage power of the fanin cone of u. The delay tuple of a node u may be extended to include the active leakage power, as $(d^r(u), d^f(u), L(u), pol(u))$. For a PI node u, L(u)=0. For an output node u, the active leakage power L(u) is the sum of the active leakage power of its direct predecessors, i.e., $$L(u) = \sum_{(v,u) \in E} L(v). \quad (13)$$

For an input node u other than PI nodes, let wu be the driver node of u, and nwu be the net driven by wu and driving u. The active leakage power L(u) of u is sum of the active leakage power of driver node wu and the active leakage power of net nwu divided by fanout of net $n_{wu}$, i.e., $$L(u) = L(w_u) + L(n_{wu})/FO(n_{wu}), \quad (14)$$

where $L(n_{wu})$ is the leakage power of net $n_{wu}$ as computed by equation (12), and $FO(n_{wu})$ is the fanout of net $n_{wu}$.

During minimal delay tuple set computation in the algorithm MDTS in FIG. 4, a refined delay tuple dominance is used to prune delay tuples. For a delay tuple t1 to dominate tuple t2, in addition to the condition of same polarity and smaller delays, tuple t1 also must have smaller leakage power than tuple t2. More formally, tuple $(d^r_1(u), d^f_1(u), L_1(u), pol_1(u))$ dominates tuple $(d^r_2(u), d^f_2(u), L2(u), pol_2(u))$ if and only if $pol_1(u)=pol_2(u)$, $d^r_1(u) \leq d^r_2(u)$, $d^f_1(u) \leq d^f_2(u)$, and $L_1(u) \leq L_2(u)$. With the additional conditions for tuple dominance, it may become more likely than the previous algorithm that the number of remaining tuples after pruning would grow too large for memory and runtime limits. When that happens, one can always trade the optimality with memory and runtime by pruning more tuples, even the tuples are not dominated tuples. In the back trace phase, the delay tuple with the minimum active leakage power that meets the timing constraint is selected.

The flow chart of FIG. 6 shows an embodiment of a method according to the present invention. The method shown in FIG. 6 can be applied in the DAG context.

First at reference numeral 40, a timing graph (e.g., a database like structure) is created. Next, at reference numeral 42, the minimum delay tuples for nodes in the timing graph are computed. Next, at reference numeral 44, a decision is made concerning whether at least one of the computed tuples is a feasible delay tuple.

If none of the completed delay tuples is feasible, at reference numeral 46 the longest path is determined and minimum delay tuples are computed for the longest path. Next, at reference numeral 48, the polarities on the longest path are changed to reduce delays and the timing graph is updated by transferring the new polarity and delay values to the existing time graph at reference numeral 50.

Next, at reference numeral 52, timing analysis is performed to determine a new longest path and minimum delay tuples for nodes in the timing graph are computed. Next, at reference numeral 54, a decision is made whether the new longest path is shorter than the previous longest path. If not, the resulting polarity selection is ignored and the process proceeds to reference numeral 56 to terminate the process.

If, at reference numeral 44, it was determined that the at least one computed delay tuple is a feasible delay tuple, the best feasible delay tuple is selected for implementation and the process proceeds to reference numeral 56.

If, at reference numeral 54, it was determined that the new longest path is shorter than the previous longest path, the resulting polarity selection is accepted at reference numeral 60 and the process returns to reference numeral 46.

A flow chart for the tree interconnection network context would be similar down to the first decision point. Since there would definitely be a feasible delay tuple in the tree interconnection network, this first decision point would always be "yes," and the flow would continue as shown, without ever entering the "no" branch. For the slack embodiment, one can simply substitute "greatest slack path" for "longest path delay" in the flow chart. For a leakage minimization embodiment, "leakage" is substituted for "delay"; and "highest leakage" is substituted for "longest" in FIG. 6. A step may also be added to test the timing after each path is adjusted to make sure the timing of the new polarity selection does not exceed user specifications. If the timing exceeds the user specifications, the system will select the previous polarity selection that best optimized leakage while still meeting the user timing specification. Similarly, the timing flow could be modified so that improved timing changes that make leakage power exceed a user-specified maximum will not be implemented.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for reducing delay in an integrated circuit by compensating for differences in rise and fall delay times comprising:
   creating a timing graph for a circuit having a set of switching output polarities;
   computing minimum delay tuples for nodes in the timing graph;
   if there is not at least one feasible delay tuple, determining a longest path and computing minimum delay tuples for the longest path;
   changing output polarities on the longest path to create a new set of switching output polarities;
   updating the timing graph using the new set of output polarities;
   performing timing analysis to determine a new longest path;
   if there is not at least one feasible delay tuple:
      determining a longest path and computing minimum delay tuples for the longest path;
      changing output polarities on the longest path to create a new set of switching output polarities;

updating the timing graph using the new set of output polarities;
performing timing analysis to determine a new longest path;
  if the new longest path is shorter than the longest path, accepting the new set of switching output polarities;
  if the new longest path is not shorter than the prior longest path, accepting the set of switching output polarities; and
implementing a user-program bitstream using the one of the set of switching output polarities and the set of new switching output polarities that was accepted; and
programming the circuit into a programmable logic device using the user-program bitstream.

2. The method of claim 1 further including:
(a) selecting a tree interconnection network;
(b) identifying all LUTs in the tree interconnection network;
(c) selecting the output polarity of all LUTs in the tree interconnection network so that the maximum delay from primary inputs to primary output in the tree interconnection network is minimized; and
repeating (a) through (c) for all other tree interconnection networks in the circuit.

* * * * *